United States Patent [19]

Young

[11] 4,193,833

[45] Mar. 18, 1980

[54] ULTRASONIC PACKAGING MACHINE

[75] Inventor: John L. Young, Livonia, Mich.

[73] Assignee: Ex-Cell-O Corporation, Troy, Mich.

[21] Appl. No.: 899,141

[22] Filed: Apr. 24, 1978

[51] Int. Cl.$^2$ ............................ B32B 31/00; B31B 1/26
[52] U.S. Cl. .................... 156/358; 156/580.1; 93/44.1 GT
[58] Field of Search .............. 156/73.1, 580.1, 358; 93/44.1 GT

[56] References Cited

U.S. PATENT DOCUMENTS

| | | | |
|---|---|---|---|
| 3,439,392 | 4/1969 | McNab | 156/73.1 |
| 3,505,136 | 4/1970 | Attwood | 156/73.1 |
| 3,823,055 | 7/1974 | Schulz et al. | 156/580.1 |
| 3,905,280 | 9/1975 | Eqleston | 93/44.1 R |
| 3,910,014 | 10/1975 | Braun | 53/373 |
| 3,937,131 | 2/1976 | Kellogg | 93/44.1 R |
| 4,072,089 | 2/1978 | Bosche | 156/580.1 |

*Primary Examiner*—Douglas J. Drummond

[57] ABSTRACT

Apparatus is disclosed for forming a seal between layers of a carton of thermoplastic coated paperboard material and the like in a sealant activating station wherein the sealant is activated and a clamping and sealing station wherein the sealant is allowed to cool and set under pressure to form a seal between the layers. The carton first moves to the activating station wherein the layers to be sealed are engaged on opposite surfaces by a vibrating horn and a movable first backup member in the form of an anvil for a time sufficient to activate the thermoplastic material which serves as a sealant. A first adjustable overtravel spring assembly biases a first backup means. The carton then moves to the clamping and sealing station where a movable pressure pad and a second backup member engage the layers having the activated thermoplastic thereon for a predetermined period of time to permit the activated thermoplastic to cool, set and form a seal. A second adjustable overtravel spring assembly biases a pressure pad. The carton is carried by a conveyor assembly, which is synchronized with the movement of the first back member and the pressure pad.

22 Claims, 6 Drawing Figures

ULTRASONIC PACKAGING MACHINE

TECHNICAL FIELD

This invention relates generally to a packaging apparatus and in particular with packaging apparatus for forming a seal between layers of cardboard in the form of thermoplastic coated paperboard material and the like wherein the thermoplastic material of the layers is activated by frictional heat from a vibration welding horn and then allowed to cool and set under pressure to form a seal between the layers.

BACKGROUND ART

The type of container with which the present invention is particularly concerned is the type made of paperboard stock coated on both sides with a thermoplastic material such as polyethylene. The thermoplastic coating is utilized not only as moisture proofing material, but also serves as an adhesive which cooperates in sealing the seams, joints and closure elements of the container so as to make the container fluid tight when it is filled with milk or other contents, and sealed and closed. An example of this general type of container is disclosed in U.S. Pat. Nos. 3,120,089, 3,309,841 and 3,910,014.

Until relatively recently, the conventional manner of sealing thermoplastic coated paperboard cartons was to activate the thermoplastic coating, by the application of heat, to cause it to flow at the portions to be joined and sealed, and then bring the layers of the end closures into contact with each other. When the thermoplastic material between the layers cooled and was set, the layers were sealed and fused together. In addition to requiring the use of elaborate and expensive apparatus for generating the considerable amount of energy required, elaborate apparatus, methods and systems were also required to dissipate the heat from the plant in which the packaging operation was being carried out. Examples of this general type of packaging apparatus are shown in U.S. Pat. Nos. 3,002,328; 3,120,089; 3,166,994; 3,187,647; 3,239,995 and 3,309,841.

U.S. Pat. Nos. 3,905,280 of Sept. 16, 1975, 3,910,014 of Oct. 7, 1975 and U.S. Pat. No. 3,956,046 of May 11, 1976 disclose apparatus for sealing the end closures and side seams of thermoplastic coated paperboard containers by vibration welding wherein mechanical energy is converted into localized heat energy to minimize the amount of heat and energy required, and to eliminate the necessity for expensive systems and methods for dissipating the excess heat. U.S. Pat. No. 3,526,792 discloses an ultrasonic transducer having a converter for converting electrical energy into mechanical energy, and a concentrating horn for concentrating the mechanical energy into vibrations at a desired frequency. In the above mentioned U.S. Pat. Nos. 3,905,280, 3,910,014 and 3,956,046 the horn vibrates at a predetermined frequency when energized, and cooperates with an anvil or other backup means to clamp the layers of the thermoplastic coated paperboard between the working surface of the horn and backup or work surface of the anvil. When the thermoplastic coated paperboard layers are clamped between the work surfaces of the horn and anvil, vibration of the horn creates frictional heat sufficient to activate the thermoplastic coating of the layers to cause the thermoplastic material of the layers to flow together. When the vibration is terminated, the thermoplastic will cool and set to form a seal between the layers thereby bonding the layers together throughout the area of the seal.

An additional advantage of sealing by sonic, or vibration welding, is that it is not necessary to allow for or eliminate any surface contamination or moisture because of the concentrated application of energy. When heat is applied directly rather than by vibration welding, energy must be expended to evaporate any moisture on the sealing surfaces before the thermoplastic material can be heated sufficiently to activate it. Variations in the amount of moisture on the sealing surface causes a wide variation in the thermal energy required. Moreover, the presence of moisture causes the thermal energy input demand to be far in excess of that which is required to activate the thermoplastic when the surfaces are dry. This problem is obviated by vibration welding because of the concentrated application of energy, making the amount of energy required to evaporate any moisture relatively insignificant.

There are two stages in the sealing operation of thermoplastic coated paperboard containers by vibration welding. These stages are: (1) the activation stage in which the friction of the vibrating horn generates heat sufficient to activate the thermoplastic coating; and (2) the cooling stage wherein the layers are clamped together to permit the previously activated thermoplastic coating to cool and set to form the seal.

A significant factor in determining the production rate is the amount of time required in the sealing operation. It has been a general practice to utilize the horn exclusively for both the activation stage and as a clamping member for the cooling stage. When the horn is used exclusively for both stages, a complete cycle of forming a seal between the layers of the carton involves (1) bringing the working surfaces of the anvil (or other backup means) and horn into opposed relationship on opposite sides of the layers to be joined and sealed, (2) activating the thermoplastic coating of the layers between the work surface by the frictional heat of the energized horn to cause the coating of the layers to flow together, (3) permitting the previously activated thermoplastic material to cool and set while still held between the working surfaces of the anvil and deenergized horn, and (4) separating the working surfaces of the anvil and horn to remove the carton layers after the seal has been formed. The time involved per cycle to date has been in the range of approximately one-half to two seconds, or more, depending upon the thickness of the paperboard, the thickness of the thermoplastic coating, the number of layers, and the surface area to be sealed.

It has been conventional in vibration welding operations of this type to pressure actuate the horn to start the horn vibrating. In some applications the working surface of the horn moves into contact with the layers of the carton to be joined together, the horn starts vibrating when a predetermined pressure on the working surface of the horn is sensed by horn actuating controls. In a high production packaging system, the available time for the sealing operation is determined primarily by the speed at which the cartons must pass through the welding cycle as determined by the speed of other machines in the total system. For example, the welding apparatus must be incorporated into a system including machines for feeding and erecting cartons from flat blank form, such as machines of the type disclosed in Allen U.S. Pat. No. 3,599,541 of Aug. 17, 1971 and in Kellogg U.S. Pat. No. 3,937,131 of Feb. 10, 1976, and filling and closing apparatus such as disclosed in Braun U.S. Pat. No. 3,910,014.

U.S. application Ser. No. 652,916 of Eugene R. Bosche and Earle W. Walke, Jr., filed Jan. 28, 1976, and assigned to the assignee of this application, discloses an apparatus and method for vibration welding thermoplastic coated paperboard containers wherein the vibration welding horn is "pre-triggered" to start it into vibration prior to the time it engages the layers of the container to be sealed. U.S. application Ser. No. 690,221 of Eugene R. Bosche, filed May 26, 1976, and assigned to the assignee of this application, discloses a method and apparatus for forming a seal between the layers of thermoplastic coated paperboard cartons by vibration or sonic welding in which the vibration welding horn is utilized to activate the thermoplastic material of the carton. The carton is then moved to a clamping and cooling station with the thermoplastic material still activated, where the activated layers are then clamped and cooled to form a seal. The entire disclosure of U.S. application Ser. Nos. 652,916 and 690,221 are incorporated herein by reference.

In U.S. application Ser. No. 846,481 the concept of activating the thermoplastic coating at one station and cooling and clamping the layers at another station (i.e. two-station sonic sealing) is further developed. It has been found desirable, at least in some circumstances, to permit partial setting of the activated thermoplastic at the activation station. The horn is pre-triggered to cause it to start vibrating before it comes into clamping engagement with the paperboard layers. After the activation time has been completed, the horn stops vibrating but remains in clamping engagement with the layers to permit partial setting of the activated thermoplastic to begin formation of the seal. The horn is then withdrawn, and the container moves to a clamping and cooling station to complete the formation of the seal by clamping and cooling the layers for the time necessary to complete the setting of the activated thermoplastic.

DISCLOSURE OF THE INVENTION

An object of this invention is to provide an improvement in an apparatus for forming a seal between layers of thermoplastic coated paperboard material and the like by vibration welding wherein a horn and a backup means cooperate to activate the thermoplastic material at an activating station wherein movement of the backup means relative to the horn is controlled to reduce impact therebetween.

A further object is to provide an apparatus for closing and sealing the end closures of cartons of thermoplastic coated paperboard material or the like wherein a horn assembly and a backup means cooperate at an activating station to activate the thermoplastic coating and wherein the horn assembly is pivotally connected to a support means to enable the horn assembly to pivotally move away from the activating station for cleaning and other servicing purposes.

An apparatus constructed in accordance with the instant invention comprises a horn located at the activating station having a first work surface for engaging one outer surface of the layers in the area to be sealed. A backup means located at the sealant activating station has a second work surface for engaging the opposite outer surface of the layers in the area to be sealed and opposes the first work surface of the horn at the activating station. A biasing means biases one of the horn and the backup means. The backup means is movable with respect to the horn between an inactive position and an active position in which the opposed work surfaces of the horn and backup means engage the layers to be sealed in a clamping relationship and returning to the inactive position after remaining in the active position with the horn energized for a predetermined period of time sufficient to activate the thermoplastic material of the layers by generating frictional heat. The biasing means allows the active position of the backup means to vary.

In further accordance with the instant invention, the apparatus includes a horn assembly located at the activating station and having a first work surface for engaging one outer surface of the layer in the area to be sealed. A backup means or anvil is located at the sealant activating station and has a second work surface for engaging the opposite outer surface of the layers in the area to be sealed that opposes the first work surface of the horn assembly at the activating station. A pivot means pivotally connects the horn assembly to a support means which supports the horn assembly. The horn assembly is pivotally movable from the sealant activating station. When a thermoplastic coated paperboard container is fed into the activating station, the horn is energized, and synchronously, the anvil moves towards the vibrating horn until the horn and the anvil are brought into engagement with the outer surfaces of the end closure in the area to be sealed to activate the thermoplastic coating of the layers. The distance separating the horn and the anvil in the active position is allowed to vary by a first biasing means to accommodate differing thicknesses of the paperboard material. The first biasing means further reduces the impact force between the horn-backed container and the anvil as the anvil comes towards the vibrating horn. The horn is then deenergized with the end closure still held to permit partial setting of the activated thermoplastic. The anvil is then retracted and the carton is moved to the clamping and sealing station where the layers are held in their closed position between a second backup means and a movable pressure pad. The pressure pad is actuated to come into engagement with the outer surface of the end closure layers in the area to be sealed at a fourth work surface urging the layers against a third work surface of the second backup means. The pressure pad and the second backup means hold the layers in clamped relationship between their working surfaces until the thermoplastic material sets to complete the seal.

Other objects, advantages and features of the invention will become apparent from the following description taken in connection with the accompanying drawings.

BEST MODE FOR CARRYING OUT THE INVENTION

The present invention is primarily concerned with closing and sealing the end closures of the thermoplastic coated paperboard cartons of the general type illustrated in U.S. Ser. No. 846,481 having a filing date of Oct. 28, 1977. However, it should be understood that the invention is not limited to use with any particular form of carton. The invention has use also with cartons of the type shown, for example, in Egleston et al, U.S. Pat. Nos. 3,120,335 and 3,905,280. The apparatus according to the present invention may be used to close and seal such containers following pre-breaking and filling of the containers generally indicated at 10 in FIGS. 1 and 2. The container 10 is made from a blank and is folded in the form of a tubular body having a rectangular cross-section, the panels of the container being folded along score lines. The container 10 which has a thermoplastic coating such as polyethylene on both sides thereof includes a top closure portion 12.

Figure 1:
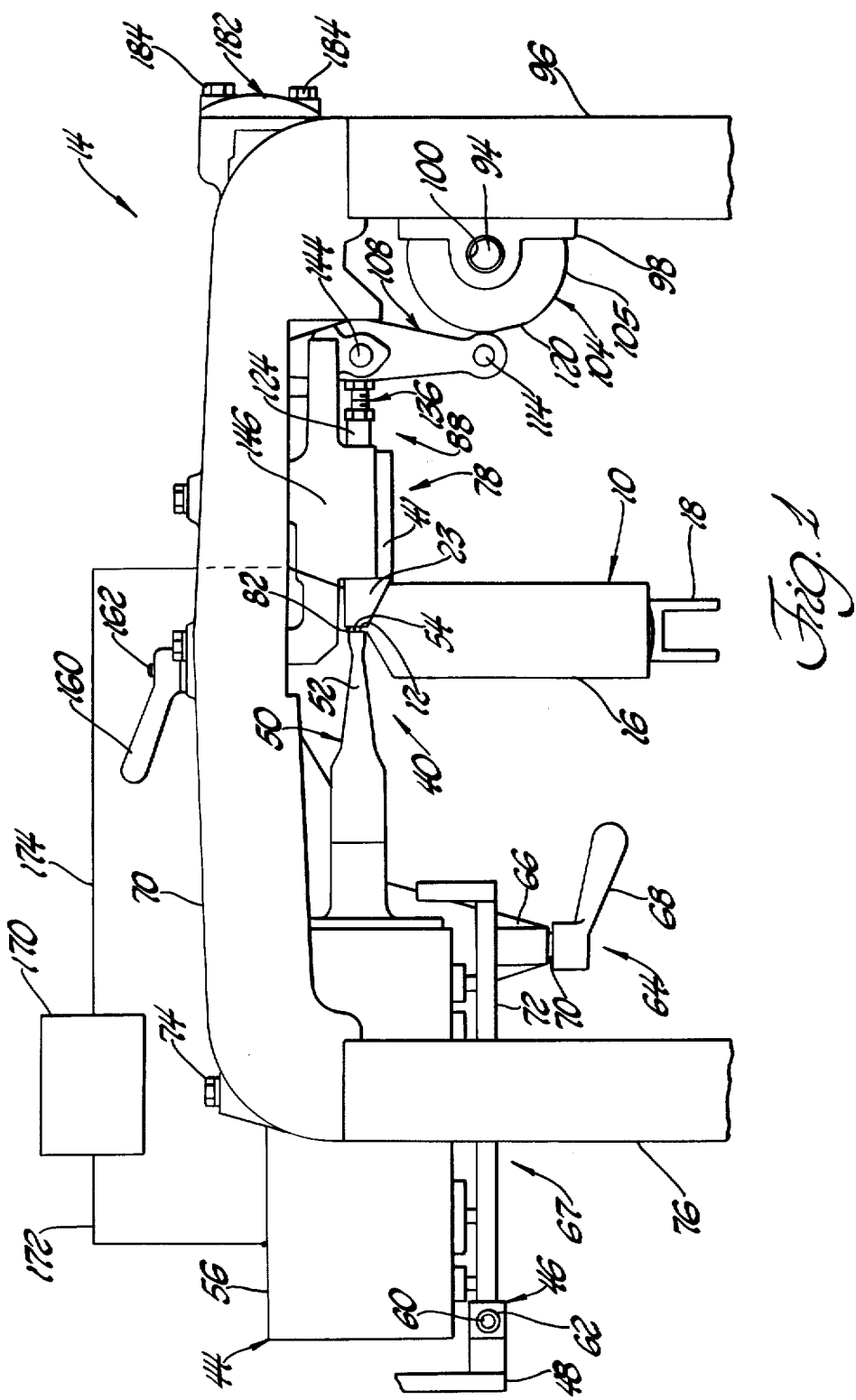
FIG. 1 is a broken away side elevational view of apparatus embodying the invention.
Figure 2:
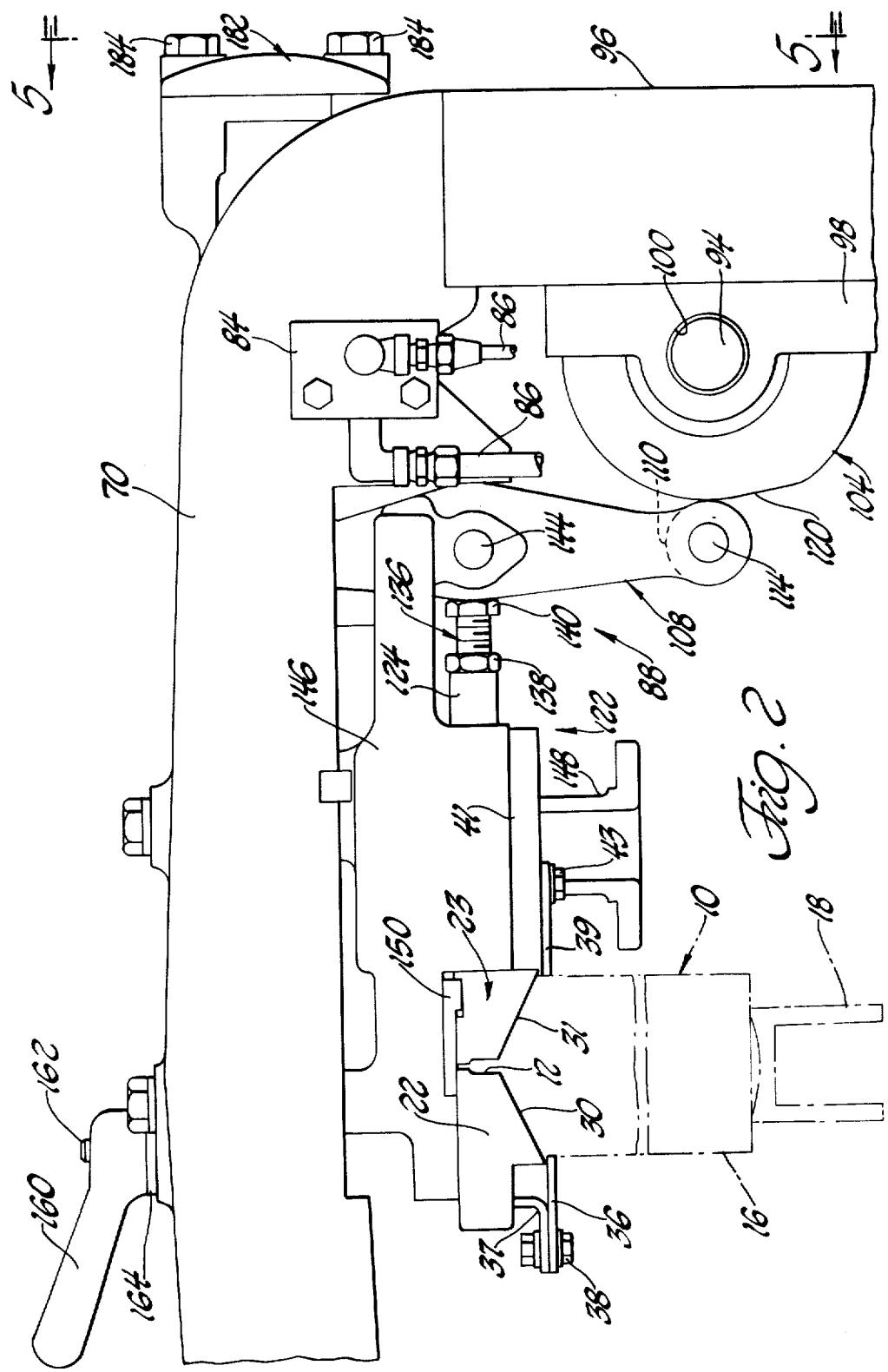
FIG. 2 is a side elevational view, slightly enlarged, of a carton, in phantom prior to entering the activating station.
Figure 3:
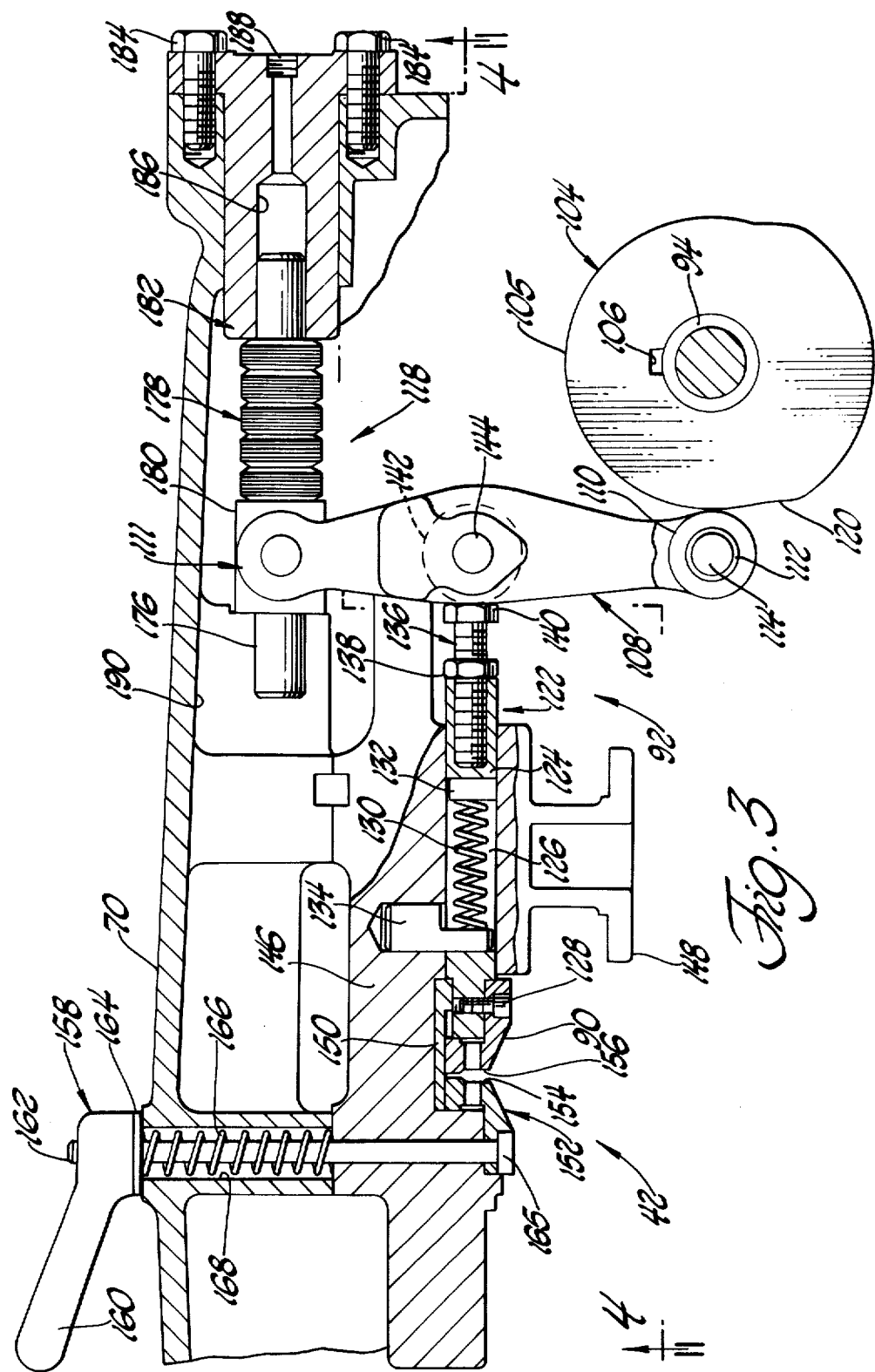
FIG. 3 is a view partially in cross-section of the apparatus at the clamping and sealing station.
Figure 4:
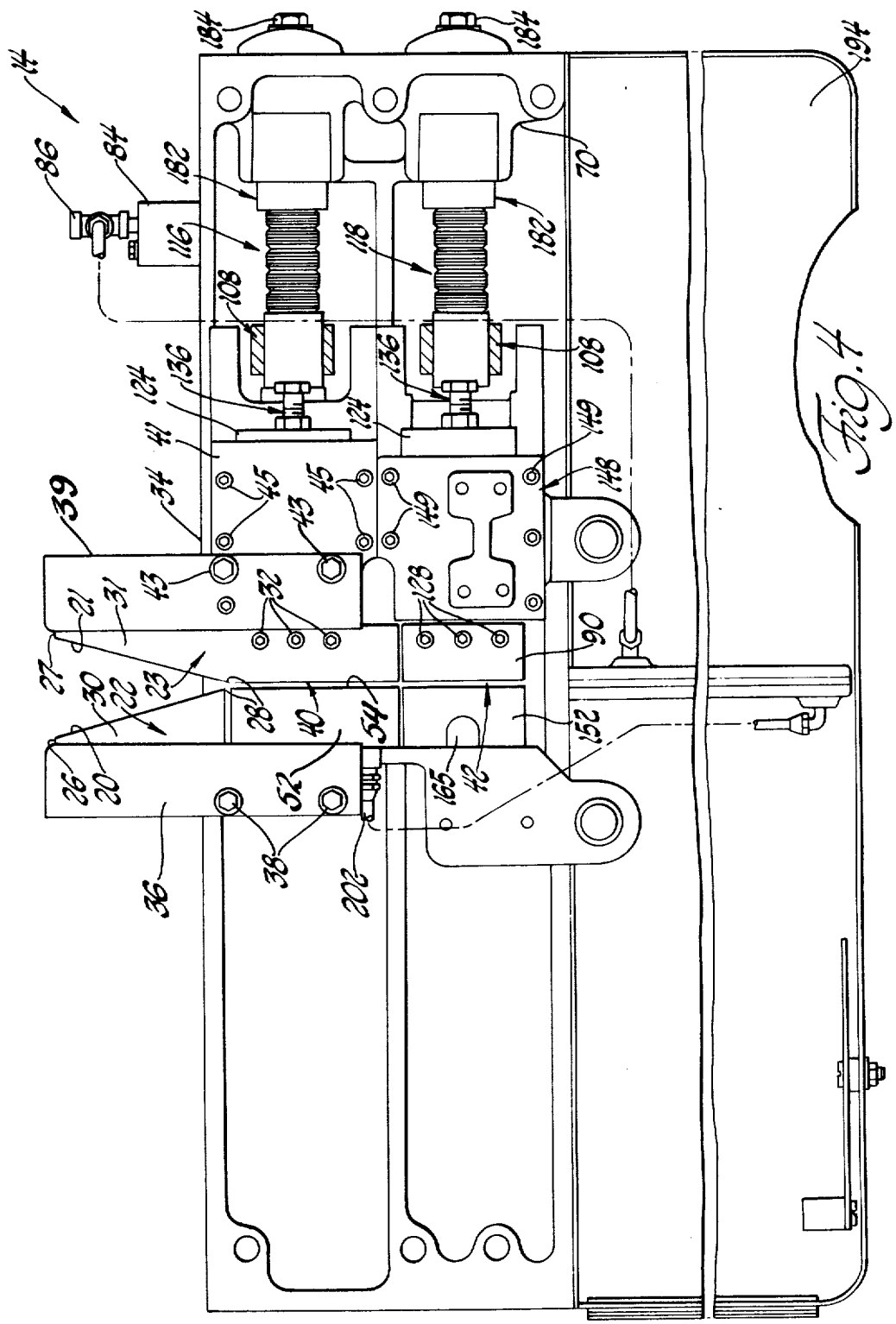
FIG. 4 is a fragmented bottom view partially in cross-section, and partially broken away, taken along lines 4—4 of FIG. 3.

In FIG. 1, reference numeral 14 collectively designates an activating and sealing assembly for closing and sealing the top or end closure portion 12 of the container 10. The container bottoms 16 are supported on a support bar 18 and are advanced along the support bar 18 by conveyor chains (not shown) for engaging the containers 10. The construction of the conveyor chains may be of the same construction as that disclosed in U.S. Pat. No. 3,910,014. The conveyor chains advance the cartons 10 into and within the assembly 14 or into the paper as shown in FIGS. 1 and 2. As shown in FIG. 4, which is a bottom view of the assembly 14, the cartons 10 (not shown) move in downward direction wherein the closure panels of the top closure portion 12 are engaged by opposed edges 20 and 21 of closing or guiding plates 22 and a first backup means or an anvil 23. The edges 20 and 21 cooperate to define a closing slot 24 which flares inwardly from the inlet ends 26 and 27 to outlet ends 28 and 29 of the edges 20 and 21, respectively. Both surfaces 30 and 31 of the guiding plate 22 and the anvil 23 engage the top panels of the carton 10. Fasteners 32 secure the anvil 23 to a spring assembly (not shown, but structurally the same as spring assembly 122 as shown in FIG. 3, which will be described hereinafter). The guiding plate 22 is secured between the housing 146 and a carton guide 36. The carton guide 36 is mounted to the housing 146 through a guide bracket 37 by means of nut and bolt assemblies 38. A second carton guide 39 is secured to a slide plate 41 by means of bolts 43. The slide plate 41, in turn, is bolted to the housing 146 by bolts 45.

As the containers 10 move from the wide end of the closing slot 24 to the narrow end at edges 28 of the anvil 23 and the guiding plate 22, the panels of the top or end closure 12 of container 10 are closed together by the edges 20 and 21 of the slot 24. The containers 10 then move toward an activating station generally indicated by reference numeral 40, the carton 10 being illustrated by the activating station in FIG. 1. A clamping and sealing station is generally indicated by reference numeral 42 in FIGS. 3 and 4.

Figure 6:
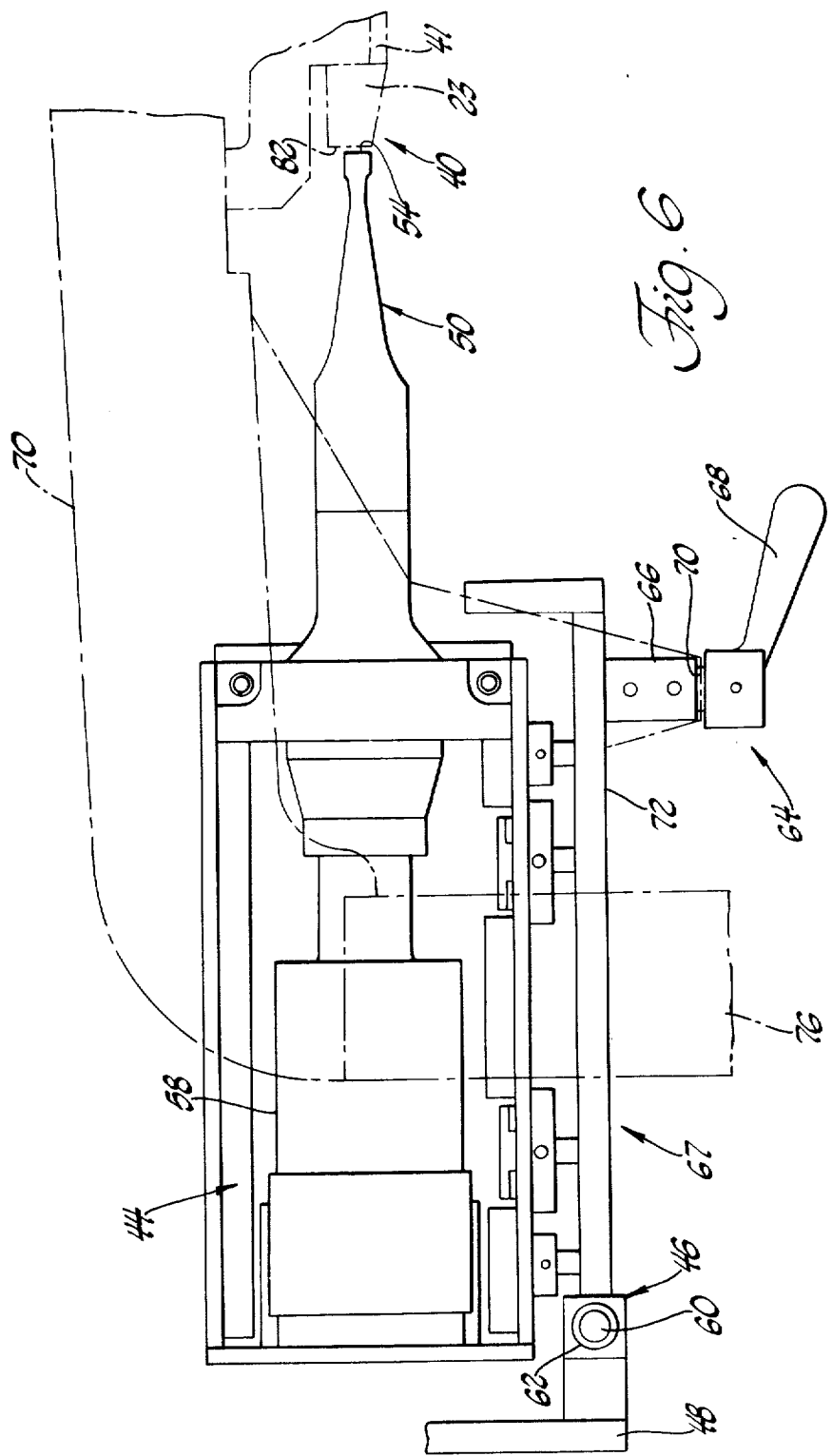
FIG. 6 is a side elevational view of the apparatus of FIG. 1, slightly enlarged, a portion of the apparatus shown in phantom lines with the side panels of the horn assembly removed.

With reference primarily to FIGS. 1 and 6, the assembly 14 includes a horn assembly or sonic welding unit generally indicated at 44 pivotally mounted at a pivot point 46 on a support means or an L-shaped bracket 48. The vibration or sonic welding unit 44 may be of the type disclosed in U.S. Pat. No. 3,910,014 and includes a concentrating horn generally indicated at 50 having a tapered blade-like portion 52 with a first working surface or work surface 54 defined at its lower end. The first working surface 54 is a surface that engages the layers of the inner top closure portion 12 as shown in FIG. 1.

The sonic welding unit 44 includes a housing 56 for a converter 58 which is air cooled as shown in FIG. 6 for converting electrical energy into mechanical energy which in turn causes the horn 50 to vibrate at its desired frequency and in this case at 20,000 hertz.

The horn assembly 44 is pivotally mounted at the support bracket 48 at a pivot point 46. The pivot point 46 includes a pivot pin 60 disposed within a bushing 62 to enable the horn assembly 44 to pivot about the longitudinal axis of the pin 60.

A locking means or lever assembly generally indicated at 64 locks the horn assembly 44 to a support member 66 of the support structure 67 of the horn assembly 44. The lever assembly 64 includes a threaded lever 68 and a threaded bolt 70, which bolt 70 extends through the support member 66 and into a bottom carriage member 72 of the horn assembly support structure 67.

The lever assembly 64 secures a cover or cover plate 70 over the horn assembly 44. A portion of the cover extends over the support member 66 to be secured thereto by the lever assembly 64.

As shown in FIG. 1 the anvil 23 is located at the activating station 40 and has a working surface 82. The working surface 82 is the surface that is engaged by the layers of the top end closure 12 of the container 10. The anvil 23 is formed with a pair of spaced transverse passages (not shown) which communicate with a cooling block 84 to which is secured a pair of conduits 86 only one of which is shown in FIG. 4 so that water or other cooling fluid can be circulated through the cooling block 84 and therefore the anvil 23, during operation of the assembly 14.

The anvil assembly 78 is movable with respect to the horn 50 between a retracted inactive position and an extended active position as shown in FIG. 1 and FIG. 6. In the extended active position the opposed work surfaces 54 and 82 of the horn 50 and the anvil 23, respectively, engage the layers of the container 10 to be sealed in a clamping position. As previously described, in such a clamping position the vibration of the horn 50 generates frictional heat to activate the thermoplastic material of the layers.

A first biasing means or a first biasing assembly generally indicated at 88 in FIG. 1 biases the anvil 23 to thereby allow the active position of the movable anvil 23 to vary according to the thickness of the carton layers which are typically about 0.060 inches. In the extended active position of the anvil 23, the gap size is between 0.004 and 0.006 inches. The difference in size between 0.060 and either 0.004 or 0.006 inches is made up in the crushing of the carton layers and take-up in the first biasing assembly 88.

Both the anvil assembly 78 and the first biasing assembly 88 will be described greater detail hereinafter with reference to FIG. 3 which shows a pressure pad generally indicated at 90 which operates in substantially the same fashion as the anvil 23 and a second biasing means or biasing assembly generally indicated at 92 which also operates in substantially the same fashion as the first biasing assembly 88. The operation of the anvil 23 and the pressure pad assembly 90 will be described together and the operation of the first biasing assembly 88 and the second biasing assembly 92 will be described together.

As previously noted, carton carrying assembly of the conveyor assembly includes the support bars 18. The conveyor assembly also includes a rotating shaft 94 which is also used to drive the conveyor chains not shown which may be of the same construction as that disclosed in U.S. Pat. No. 3,910,014. The rotating shaft 94 is mounted on a support member 96 by means of a support bracket 98 which is fixedly attached to the support member 96. The support bracket 98 allows the shaft 94 to rotate by means of a bushing 100. A pair of keys (not shown) fixedly secure the rotation shaft 94 to a pair of substantially identical cam members 104, shown in FIG. 5, by inserting the keys within grooves 106 formed along the inner surfaces of the cam members 104 and within corresponding slots formed through the top surface of the shaft 94. In this way the cam members 104 rotate with the rotating shaft 94.

The rotating cams 104 rotate in timed synchronization with the conveyor assembly which moves the containers 10 into the apparatus 14. As shown in FIGS. 1, 2 and 3 the cam members 104 are eccentric or in other words a portion 120 of their outer surface 105 is flat. A pair of substantially identical followers or levers generally indicated at 108 have rollers 110 which engage the eccentric surfaces 105 of the cams 104. Each roller 110 is rotatably mounted on a bushing 112 which in turn is mounted on a roller pin 114 of each follower 108.

Figure 5:
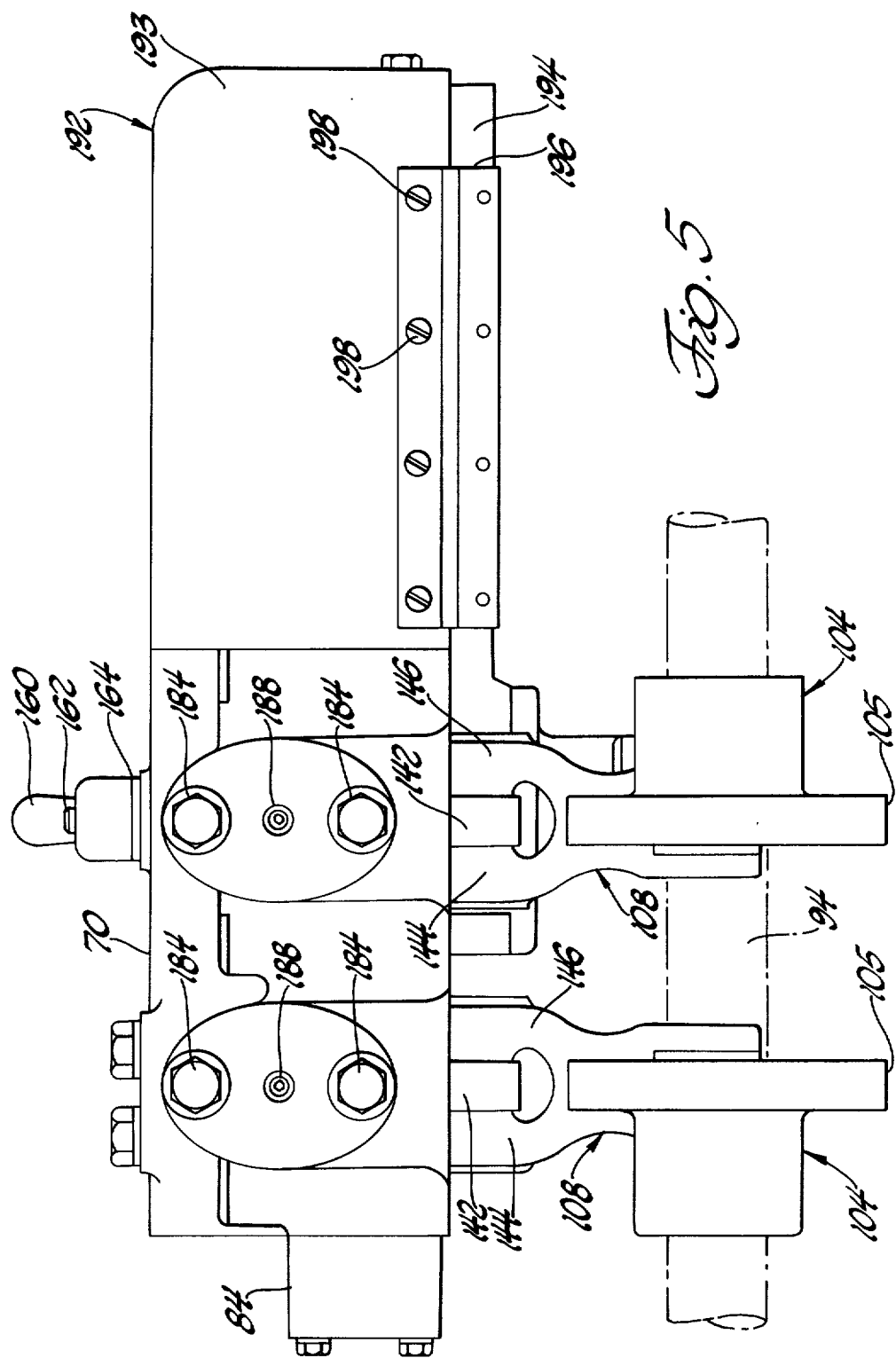
FIG. 5 is an end elevational view of the apparatus of FIG. 1 as viewed along lines 5—5 of FIG. 2.

The ends of the followers 108 opposite the rollers 110 are rotatably connected to a pair of substantially identical assemblies 116 and 118. The spring assembly 116 is a portion of the first biasing assembly 88 and the spring assembly 118 is a portion of the second biasing assembly 92. The first spring assemblies 116 and 118, respectively, will be described in greater detail hereinafter with reference to the spring assembly 118. As the cams 104 rotate through 360 degrees the rollers 110 encounter the flat portions 120 of the eccentric surfaces 105. When this occurs each follower 108 rotates to the right about a pivot point 111 interconnecting the follower 108 and the second spring assembly 118 as shown in FIG. 3. This backward movement of the follower 108 results because the pressure pad, like the anvil 23, is spring loaded by a second spring means or second spring assembly generally indicated at 122 in FIG. 3, each of the second spring assemblies being substantially identical. Each second spring assembly 122 includes a slide 124 having a slot 126 formed in the central portion thereof. The pressure pad 90 and the anvil 23 are fixedly secured to their respective slides 124 by means of screws 128 and 32, respectively, to move therewith. Contained within the slots 126 is a biasing spring 130 which is disposed between a slide retainer 132 and a slide retainer pin 134. An adjusting screw 136 is threadedly inserted at one end of each of the slides 124 and locked in position by a locking nut 138 to effectively vary the length of the second spring or slide assemblies 122 between the followers 108 and their corresponding pressure pad 90 and anvil 23. The heads 140 of each of the adjusting screws 136 engage rollers 142 of the followers 108. The rollers 142 are mounted on roller pins 144 between two fingers 144 and 146 of the followers 108 as best seen in FIG. 5.

When the rollers 110 of the followers 108 engage the flat surfaces 120 of the cams 104, the springs 130 urge the slides 124 to the right as shown in FIG. 3. The springs 130 coact with the slide retainer pins 134 which are disposed within the housing 146 and the slide retainers 132 which are disposed within the slots 126 engaging the walls of the slots 126. The slides 124 slide over the corresponding top surfaces of the slide plate 41 and a slide bracket 148 which support the slide assemblies 122. The pressure pad 90, the anvil 23 and the slides 124 also slide against lower surface of a guide plate 150 and the lower surface of the housing 146.

The pressure pad 90, as well as the anvil 23, move to their retracted inactive positions which can be varied by adjusting the length of the adjusting screws 136 within the slides 124 to increase and decrease the effective length of the slides 124. In FIG. 3 the pressure pad 90 is shown in its retracted inactive position due to the roller 110 engaging the flat surface 120 of the cam 104. When the roller 110 engages the curved surface of the eccentric surface 105 the follower 108 moves to the left as shown in FIG. 3 and forces the slide 124 and the pressure pad 90 to an extended active position which is shortly after a carton 10 with activated thermoplastic had moved into the clamping and sealing station 42. The clamping time, at both the activating station 40 and the clamping and sealing station 42, are determined by the geometric configuration of the cam 104 and, more particularly, the speed of the rotating shaft as well as the amount of flat surface 120 on the surface 105.

A second backup means or a second anvil 152 is located at the clamping and sealing station 42. The second anvil 152 is cooled like the first anvil 23. The second anvil 152 has a third work surface 154 for engaging the outer surface of one of the layers of the carton 10 at the top portion 12. The pressure pad 90 has a fourth work surface 156 for engaging the opposite outer surface of the layers and that opposes the third work surface 154 in the extended active position.

The second anvil 152 is secured to the housing 146 by a second lever assembly generally indicated at 158 which is substantially the same as the first lever assembly 64. The second lever assembly 158 includes a threaded lever 160, a threaded rod 162 which extends through the cover 70, the housing 146 and the second anvil 152 to secure them together at the lower surface of the second anvil 152. The lever assembly 158 also includes a washer 164, a securing projection 165 integrally formed at the end of the rod 162, and a biasing spring 166 disposed about the rod 162 and within an aperture 168 extending therethrough the cover 70.

Probably, the translational motion of the first anvil 23 is used to activate a microswitch schematically shown in FIG. 1 as part of a control circuit 170. Movement of the follower 108 to the left as shown in FIG. 3 causes the first anvil 23 (through its second spring assembly 122) to engage a microswitch (not shown) of the control circuit 170 to control or start the energization of the horn 50. The control circuit 170 is schematically shown as being connected to the sonic welding unit 44 by a wire conduit or other electrical conductor 172 and also electrically connected to the microswitch adjacent the anvil 23 by an electrical connector or a wire conduit 174.

The control circuit 170 controls the energization of the horn 50 by emitting an electrical signal to the power supply of the sonic welding unit 44 to commence the vibration of the horn 50. The horn 50 which is stationary with respect to the moving anvil 23 is pre-triggered or in other words is triggered before the moving anvil 23 has reached its extended active position. The horn 50 is energized to vibrate at 20,000 hertz.

The first spring assembly 116 shown in FIG. 4, biases the anvil 23 through the second spring assembly 122 secured to the anvil 123 and engaging the follower 108. The second spring assembly 118 biases the pressure pad 90 in the same fashion. As previously noted the follower 108 is pivotally attached to the first spring assembly 116. The first spring assembly 116 includes a suitable spring means, such as spring rod 176 on which are disposed a plurality of spring washers generally indicated at 178. The spring washers 178 are disposed between a block 180 and a retainer 182, the retainer 182 being mounted to the cover 70 by means of a first adjustable means or mounting bolts 184. The spring rod 176 extends through the block 180 and into a cylindrical hold 186 of the retainer 182. A relief plug 188 is provided on the outer surface of the retainer 186 for lubricating the assembly 116. The block 180 is slidably disposed within a cavity 190 of the cover 70. The retainer screws 184 may be adjusted to allow the retainer 182 to be positioned further to the right as shown in FIG. 3 thereby decreasing some of the biasing force exerted by the spring washers 178 between the retainer 182 and the block 180 and therefore, on the anvil 23 when a carton 10 is disposed between the working surfaces 82 and 54. In the same fashion, the biasing force exerted by the first spring assembly 118 can be reduced.

The amount of pressure exerted by the first spring assembly 116 on the follower 108 is critical to the welding operation. In other words the pressure must be maintained within predetermined limits over the entire area to be sealed at the top portion 12. For example, the minimum pressure required to generate sufficient frictional heat to activate the thermoplastic coating between the horn 50 and the first anvil 23 is approximately 200 psi assuming the horn is vibrating at a frequency of 20,000 Hertz. At that frequency, it has been found that the pressure should generally not exceed approximately 780 psi. By adjusting the retainer bolts 184 the pressure exerted by the first anvil 23 can be precisely adjusted making it easier to maintain pressure within the required limit of 200 psi to approximately 780 psi as a thickness of the thermoplastic coated paperboard cartons 10 increases or decreases within a range of approximately 0.012 inches to 0.060 inches including a coating of polyethylene or other thermoplastic material having a thickness in the range of 0.00075 inches to 0.0010 inches. Furthermore, the co-action of the first spring assembly 116 with the second spring assembly 122 provides a relief for keeping the biasing pressure exterted by the moving first anvil 23 as it moves towards its extended active position below a predetermined amount or the number of layers of paperboard increases.

The driving mechanism for driving the carton carrying assembly or means is disposed within a conveyor drive housing generally indicated at 192. The cover 193 of the housing 192 is hinged to a lower cover portion 194 by hinge 196 riveted to the lower portion 194 and screwed to the cover 193 by screws 198.

In operation, the cartons 10 advance downwardly as shown in FIG. 4 being guided along by the carton guide brackets 36 and guide 39. As the carton 10 advances from the wide end of the slot 24 defined by the edges 20 and 21 of the closing member 22 and the first anvil 23, respectively, to the small end of the slot 24, the panels of the top end closure 12 of the carton 10 are folded as shown in FIG. 2. When the carton 10 reaches the activating station 40 the first anvil 23 is in the process of moving to the left as shown in FIG. 3 to engage a microswitch or other control member interconnected with the controls of the sonic welding unit 44. The horn blade 52 subsequently begins to vibrate at a predetermined frequency (for example 20,000 hertz) as the anvil 23 moves from its retracted inactive position to its extended active position in which the working surface 82 of the anvil 23 engages the outer surface of layers of the carton end closure 12 in the area to be sealed. Vibration of the horn 50 generates frictional heat sufficiently to activate the thermoplastic coating of the paperboard layers of the carton 10 along the end closure 12 to cause the thermoplastic material to flow. After the horn 50 has been energized to vibrate in engagement with the outer surface of the layers of the carton 10 for a predetermined period of time, which time is built into the power supply of the horn 50, (for example 0.25 seconds) the horn is deenergized to stop the vibrating but remains in clamping engagement with a layers for a second predetermined period of time (for example 0.15 seconds) to permit the thermoplastic material to partially set to begin formation of the seal. The partial setting is enhanced by the flow of cooling fluid through the anvil 23 by means of the conduit 86 from the block 84 and conduit 202 as shown in FIG. 4 adjacent the activating station 40. The anvil 23 is then retracted out of engagement with the carton layers. The carton 10 is then advanced by the conveyor to the clamping and sealing station 42.

When the carton 10 reaches the clamping and sealing station 42 the action of the cam 104 and the follower 108 causes the second spring assembly 122 to move the pressure pad towards the left as shown in FIG. 3, from its retracted position to its extended position. The working surface 156 of the pressure pad 90 engages the outer surface of the layers along the top closure portion 12 to clamp the layers between the fourth working surface and the third working surface 154 of the second anvil 152 at a predetermined pressure for a predetermined period of time to permit the thermoplastic material to completely set and form a seal. The clamping and sealing cycle should be approximately the same amount of time as the activating cycle since the cams 104 and their surfaces 105 are substantially the same. As given in the example of the preceding paragraph, the horn 40 is in clamping engagement with the carton layers for a period of 0.40 seconds with the horn 40 vibrating for a period of 0.25 seconds and simply clamping and holding the layers for the remaining period of 0.15 seconds. Consequently, the clamping and sealing cycle in which the carton 10 is subsequently clamped between the working surfaces 156 and 154 of the pressure pad 90 and the second anvil 152, respectively, will be 0.40 seconds.

The specific times of 0.15 seconds, 0.25 seconds and 0.40 seconds and the specific dimensions and pressures given above are by way of example only and they are not to be considered limitations in the invention. These times will vary under different conditions with different materials, different thicknesses and sizes of the containers, etc. Other operating cycles are possible in each of the stations 40 and 42 with the apparatus disclosed.

While the specific form of the invention is described in the foregoing specification and illustrated in the accompanying drawings, it should be understood that the invention is not limited to the exact construction as shown. To the contrary, various alterations in the construction and arrangement of parts as well as the sequence of steps all falling within the scope and spirit of the invention will be apparent to those skilled in the arts.

What is claimed is:

1. An apparatus so constructed and arranged as to be capable of forming a seal between layers of a carton of thermoplastic coated paperboard material and the like in a sealant activating station wherein the thermoplastic material of the layers in the area to be sealed serves as the sealant, said apparatus comprising:
   a horn fixedly secured at the activating station and having a first work surface for engaging one outer surface of the layers in the area to be sealed,
   back-up means located at the sealant activating station having a second work surface for engaging the opposite outer surface of the layers in the area to be sealed and that opposes the first work surface of the horn at the activating station, and
   biasing means for biasing said back-up means, moving said backup means with respect to said horn between an inactive position and an active position in which the opposed work surfaces of the horn and back-up means engage the layers to be sealed in a clamping relationship and returning to said inactive position after remaining in the active position with said horn energized a predetermined period of time sufficient to activate the thermoplastic material of said layers by generating frictional heat, said biasing means allowing said active position to vary.

2. The apparatus as claimed in claim 1 including support means for supporting said back-up means, said biasing means being operatively associated with said support means and said back-up means to bias said back-up means, said back-up means being movable in a translational fashion between said inactive position and said active position.

3. The apparatus as claimed in claim 2 including carton carrying means operable for positioning said paperboard material at said sealant activating station.

4. The apparatus as claimed in claim 3 wherein said biasing means includes synchronization means responsive to said carton carrying means for translationally moving said back-up means from said inactive position to said active position, said carton carrying means positioning the paperboard material at said sealant activating station.

5. The apparatus as claimed in claim 4 wherein said synchronization means includes an eccentric cam-follower means mounted on a rotatable shaft of the carton carrying means for transferring the rotational motion of said shaft into the translational motion of said back-up means.

6. The apparatus as claimed in claim 5 wherein said cam-follower means includes a follower and an eccentric cam mounted on said rotating shaft, said follower engaging the eccentric surface of said cam, and wherein said biasing means includes a first spring means fixedly secured to said support means at a first end and secured to said follower at a second end, a portion of said follower engaging said back-up means to transfer the translational motion of said follower to said back-up means.

7. The apparatus as claimed in claim 6 wherein said first spring means includes a first adjustment means for adjusting the biasing force of said first spring means between said follower and said support means.

8. The apparatus as claimed in claim 7 including activation means for activating said vibrating horn, said activation means being responsive to said translational motion to activate said vibrating horn as said back-up means moves towards said active position.

9. The apparatus as claimed in claim 8 wherein said biasing means includes second spring means and said back-up means includes an anvil member having said second work surface, said second spring means being operatively associated with said anvil member and said follower for moving said anvil member from said active position to said inactive position.

10. The apparatus as claimed in claim 9 wherein said back-up means includes a second adjustment means for varying said active position.

11. An apparatus for forming a seal between layers of a carton of thermoplastic-coated paperboard material and the like in a sealant activating station wherein the sealant is activated and a clamping and sealing station wherein the sealant is allowed to cool and set under pressure to form a seal between the layers, said apparatus comprising:
   means defining a sealant activating station at one location,
   means defining a clamping and sealing station at another location,
   a horn located at said activating station that vibrates at a predetermined frequency when energized, said horn having a first work surface for engaging one outer surface of the layers in the area to be sealed,
   first back-up means located at said activating station having a second work surface for engaging the opposite outer surface of the layers in the area to be sealed and that opposes the first work surface of the horn at the activating station, said first backup means being movable with respect to said horn between a retracted inactive position and an extended active position in which the opposed work surfaces of the horn and the back-up means engage the layers to be sealed in a clamping position such that vibration of said horn generates frictional heat to activate the thermoplastic material of said layers,
   first biasing means for biasing one of said horn and said back-up means, said first biasing means allowing said active position to vary,
   carton carrying means operable to carry a carton with activated thermoplastic from the activating station upon retraction of the first biasing means to the clamping and sealing station prior to setting and cooling of the activated thermoplastic,
   a second back-up means located at the clamping and sealing station having a third work surface for engaging the one outer surface of the layers,
   a pressure pad located at said clamping and sealing station, said pressure pad having a fourth work surface for engaging the opposite outer surface of the layers and that opposes the third work surface of the second back-up means at the clamping and sealing station, said pressure pad being movable with respect to said second back-up means between a retracted inactive position and an extended active position in which the opposed third and fourth work surfaces engage the layers to be sealed in a clamping relationship, said pressure pad being operable to move from the retracted inactive position to the extended active position when a carton with activated thermoplastic moves into the clamping and sealing station to clamp the layers with activated thermoplastic together and return to the retracted inactive position after remaining in the active position a predetermined period of time sufficient to permit the activated thermoplastic to cool and set.

12. The apparatus as claimed in claim 11 including support means for supporting said first back-up means and said pressure pad, said first biasing means being operatively associated with said support means and said first back-up means to bias said first back-up means, said first back-up means being movable in a translational fashion between said inactive position and said active position.

13. The apparatus as claimed in claim 12 including second biasing means for biasing said pressure pad, said second biasing means allowing said active position of said pressure pad to vary, said second biasing means being operatively associated with said support means and said pressure pad to bias said pressure pad, said pressure pad being movable in a translational fashion between said inactive position and said active position.

14. The apparatus as claimed in claim 13 wherein each of said first and second biasing means includes a synchronization means responsive to said carton carrying means for translationally and synchronously moving its respective first back-up means and its respective pressure pad from said inactive position to said active position, said carton carrying means first positioning the paperboard material at said sealant activating station and subsequently at said clamping and sealing station.

15. The apparatus as claimed in claim 14 wherein each of said synchronization means includes an eccentric cam-follower means, the two cam-follower means being spaced apart and mounted on a rotatable shaft of the carton carrying means for transferring the rotational motion of said shaft into the translational motion of said first back-up means and said pressure pad.

16. The apparatus as claimed in claim 15 wherein each of said cam-follower means includes a follower and an eccentric cam mounted on said rotating shaft, said follower engaging the eccentric surface of said cam and wherein each of said first and second biasing means includes a first spring means fixedly secured to said support means at its first end and secured to its respective follower at its second end, a portion of each of said followers engaging its associated first back-up means and its associated pressure pad to transfer the translational motion of each of said followers to its associated first back-up means and said pressure pad.

17. The apparatus as claimed in claim 16 wherein each of said first spring means includes first adjustment means for adjusting the biasing force of each of said spring means between each of said followers and said support means.

18. The apparatus as claimed in claim 17 including activation means for activating said vibrating horn, said activation means being responsive to said translational motion as said first back-up means moves towards said active position.

19. The apparatus as claimed in claim 18 wherein each of said first back-up means and said pressure pad includes an anvil member having said second and fourth work surfaces respectively, and wherein each of said first and second biasing means includes a second spring means operatively associated with its respective anvil member and its respective follower for moving its respective anvil member from said active position to said inactive position.

20. The apparatus as claimed in claim 19 wherein each of said first back-up means and said pressure pad includes a second adjustment means for varying said active position.

21. The apparatus as claimed in claim 11 or claim 20 wherein said horn defines a portion of a horn assembly, said support means supporting said horn assembly.

22. The apparatus as claimed in claim 21 including pivot means for pivotally connecting said horn assembly to said support means wherein said horn assembly is pivotally movable from said sealant activating station.

* * * * *